United States Patent [19]

Barter

[11] 4,061,704
[45] Dec. 6, 1977

[54] TERTIARY-ALKYLPEROXY ALKYL CARBONATE INITIATORS FOR HOT AIR VULCANIZATION OF SILICONE RUBBER

[75] Inventor: James A. Barter, Akron, Ohio

[73] Assignee: PPG Industries, Inc., Pittsburgh, Pa.

[21] Appl. No.: 597,123

[22] Filed: July 18, 1975

[51] Int. Cl.² .............................................. B29H 5/01
[52] U.S. Cl. ............................... 264/83; 260/46.5 G;
264/176 R; 264/236; 264/347; 427/387
[58] Field of Search .................... 264/176 R, 236, 347,
264/83; 260/46.5 G; 427/387

[56] References Cited

U.S. PATENT DOCUMENTS

| | | | |
|---|---|---|---|
| 3,313,762 | 4/1967 | Pfeifer | 260/37 SB |
| 3,660,345 | 5/1972 | Bobear | 260/46.5 G |
| 3,781,400 | 12/1973 | Couchoud et al. | 260/46.5 G |

FOREIGN PATENT DOCUMENTS

| | | | |
|---|---|---|---|
| 46-15086 | 4/1971 | Japan | 264/236 |
| 1,009,632 | 11/1965 | United Kingdom. | |

OTHER PUBLICATIONS

"Fabricating with Silastic ® Brand Rubber," Dow Corning Chemical Bulletin 17-053, 2/1972, pp. 11 and 12.

Primary Examiner—Jeffery R. Thurlow
Attorney, Agent, or Firm—William M. Dooley

[57] ABSTRACT

Silicone rubber is vulcanized by heating in the presence of an organic peroxide initiator. Known tertiary-alkylperoxy alkyl carbonates are used in the vulcanization of molded silicone rubber articles, but have not been recommended for use in hot air vulcanization. The tertiary-alkylperoxy alkyl carbonates of the present invention provide good cures with all curing methods, including hot air vulcanization.

10 Claims, No Drawings

4,061,704

TERTIARY-ALKYLPEROXY ALKYL CARBONATE INITIATORS FOR HOT AIR VULCANIZATION OF SILICONE RUBBER

BACKGROUND OF THE INVENTION

This invention relates to novel tertiary-alkylperoxy alkyl carbonate cure initiators that are useful for the vulcanization of silicone rubber, especially hot air vulcanization; to silicone rubber compositions containing the initiators; and to the use of the initiators in vulcanization of silicone rubber, particularly hot air vulcanization.

Silicone rubbers are organopolysiloxane elastomers which perform well at temperature extremes and have exceptional resistance to solvents and compression set. They are used extensively in aerospace, electrical, appliance, and automotive applications. Typical parts made of silicone rubbers include gaskets; O-rings; cushions; sparkplug boots; hoses; seals for transmissions; self-cleaning ovens; and dishwashers; insulation for electrical wire and cable; and molded or extruded parts for electrical components.

Some silicone rubbers, such as bathtub sealant, are self-curing at room temperature, but others must be vulcanized by heating. The latter types are used with organic peroxide curing agents or initiators. Vulcanization may be accomplished in a variety of ways. Molded parts, formed by compression, injection, or transfer molding, are vulcanized in a heated mold. Calendered sheet may be wrapped on a hollow drum and exposed to steam. Duct and hose formed on a mandrel may be vulcanized in an autoclave or steam vulcanizer. Extrusions are generally vulcanized in continuous hot air vulcanization units. Extrusions can also be vulcanized in continuous hot liquid vulcanization units or, in small sections, in autoclaves.

Peroxide initiators used in vulcanization undergo thermal decomposition to form free radicals that cause crosslinking reactions between organic side groups on the silicone polymers. Among the organic peroxides reportedly in commercial use for silicone rubber vulcanization are, for example, 2,4-dichlorobenzoyl peroxide, benzoyl peroxide, dicumyl peroxide, tertiary-butyl perbenzoate, di-tertiary-butyl peroxide, 2,5-dimethyl-2,5-di(t-butylperoxy)hexane, and tertiary-butylperoxy isopropyl carbonate. Each initiator has particular advantages and limitations depending on the vulcanizing method used, the nature of the vulcanizable composition, and the properties desired in the vulcanizate.

Continuous hot air vulcanization is the most convenient method of vulcanizing extruded silicone rubber articles such as oven seals, tubing, and electrical insulation. Until now, 2,4-dichlorobenzoyl peroxide has been the recommended initiator for general use in this process. Benzoyl peroxide is not generally recommended because it tends to produce porous vulcanizates when the rubber compound is heated without external pressure. Dicumyl peroxide can be used in rubbers containing carbon black filler, but its performance is not as good as that of 2,4-dichlorobenzoyl peroxide. It is used preferably in low concentrations to produce rubbers with the low compression set desirable in gaskets and seals, but at low concentrations it may leave a skin of tacky, incompletely vulcanized rubber composition on extrudate surfaces exposed to air or steam during vulcanization. Other initiators, such as tertiary-butylperoxy isopropyl carbonate, leave an uncured skin so thick that it can easily be scraped off with a fingernail.

Although 2,4-dichlorobenzoyl peroxide is recommended for use with all silicone and fluorosilicone rubbers in the hot air vulcanization process, it has a number of serious disadvantages. It does not give acceptable results in rubbers containing carbon black filler. It is among the highest priced of the available initiators, costing almost two and one half times as much as the next lower priced initiator. Scorch or premature vulcanization can be a problem, especially in thin moldings. Of the peroxides used in curing silicone rubber, it is among the least stable, as measured by its ten hour half-life temperature, which is defined herein to be the temperature at which one-half of the peroxide in the 0.2 molar benzene solution decomposes in ten hours. The lower the half-life temperature, the less stable the peroxide. Therefore cooler milling, and sometimes cooling of the extruder barrels, is required for rubber compounds containing 2,4-dichlorobenzoyl peroxide. This peroxide is also sensitive to shock and friction. Consequently, manufacturing and handling can be hazardous, especially when the peroxide is dried enough to prevent undesirable porosity in the vulcanizate.

U.S. Pat. No. 2,374,789 discloses alkylperoxy alkyl carbonates generally and as polymerization catalysts. Tertiary-butylperoxy cyclohexyl carbonate has been reported in the chemical literature, *Journal of Organic Chemistry*, Vol. 11, page 3446 (1969). In addition, certain tertiary-alkylperoxy alkyl carbonates are known as initiators for the vulcanization of silicone rubber. U.S. Pat. No. 3,313,762 to Pfeifer discloses a class of these peroxy carbonates for use in the vulcanization of molded silicone rubber articles. The peroxy carbonates are disclosed to have substantial advantages over benzoyl peroxide and dicumyl peroxide in producing vulcanizates with superior toughness, resistance to deterioration from heat aging, and low compression set, which is a permanent deformation of rubber after it has been compressed for a time at high temperature. In addition, the peroxy carbonates are said to allow vulcanization at temperatures significantly lower than those required for dicumyl peroxide. However, the patent does not disclose any use of tertiary-alkylperoxy alkyl carbonates in a hot air vulcanization process. Furthermore, all the working examples in the patent show the use of t-butylperoxy isopropyl carbonate, which, as stated above, is unsatisfactory for use in hot air vulcanization.

Tertiary-butylperoxy isopropyl carbonate is in some respects typical of the peroxy carbonate initiators disclosed in the Pfeifer patent. It can be used with all types of fillers. It is much less sensitive to friction, mechanical, or thermal shock than 2,4-dichlorobenzoyl peroxide. Its ten hour half-life temperature as herein above defined is about 99° C.; the half-life temperature of 2,4-dichlorobenzoyl peroxide is 54° C., indicative of the latter's much lower stability. Other tertiary-alkylperoxy alkyl carbonates, including those of the present invention, have similar properties. Furthermore, the tertiary-alkylperoxy alkyl carbonates of the present invention have higher flash points, and are therefore easier and safer to handle than tertiary-butylperoxy isopropyl carbonate. They may also be dried more fully than 2,4-dichlorobenzoyl peroxide with greater safety. Initiators with the advantages of tertiary-butylperoxy isopropyl carbonate would be desirable for use in the hot air vulcanization process and similar processes.

It has now been discovered that certain novel tertiary-alkylperoxy alkyl carbonates can be employed as initiators in the hot air vulcanization of silicone rubber compounds, as well as in mold and other vulcanization methods, to provide vulcanizates having low porosity, no objectionable odor, and a smooth, firm, completely cured surface. The novel initiators are characterized as having a total of at least 12 carbons in the alkyl portions of the molecule.

DETAILED DESCRIPTION OF THE INVENTION

The novel tertiary-alkylperoxy alkyl carbonates of this invention may be represented by the formula:

$$R_1-O-O-\underset{\underset{O}{\|}}{C}-O-R_2$$

wherein $R_1$ is a tertiary alkyl group having from 4 to 14 carbons and $R_2$ is an alkyl group having from 8 to 26 carbons. $R_1$ and $R_2$ preferably are simple alkyl groups, i.e., straight and branched open-chain, saturated, unsubstituted alkyl groups made up only of carbon and hydrogen atoms, such as methyl, isopropyl, t-butyl, 2-ethylhexyl, and octadecyl groups. Simple cycloalkyl groups, such as 3,3,5-trimethylcyclohexyl and 4-t-butylcyclohexyl groups, are also preferred.

$R_1$ is a tertiary group such as t-butyl, a t-amyl, cumyl, or a 1-methylcyclohexyl group in order to provide a sufficiently stable peroxide. $R_1$ may be represented by the formula:

$$R''-\underset{\underset{R'''}{|}}{\overset{\overset{R'}{|}}{C}}-$$

wherein each of R', R", and R''' is selected independently from alkyl and aryl groups having from 1 to 10 carbons, so that $R_1$ has a total of from 4 to 14, preferably 4 to 9, and ideally 4 to 5 carbons.

For example, when R', R", and R''' are all methyl groups, $R_1$ is a tertiary-butyl group. When R' is a phenyl group and R" and R''' are both methyl groups, $R_1$ is a cumyl group, which is a preferred group for $R_1$. Two or three of R', R", and R''' may belong to a ring system, so that $R_1$ may be a tertiary cycloalkyl group such as 1-methylcyclohexyl or a 1-adamantyl group. Other examples of $R_1$ include 2,3-dimethyl-2-butyl, 3-ethyl-3-pentyl, 2,4,4-trimethyl-2-pentyl, 1-methylcyclopentyl, and tertiary-amyl groups.

Specific examples of $R_2$ include 3,3,5-trimethylcyclohexyl, 4-t-butyl-cyclohexyl, bornyl, 2-ethylhexyl, octyl, 2,6-dimethyl-4-heptyl, 2,6,8-trimethyl-4-nonyl, decyl, dodecyl, tetradecyl, hexadecyl, octadecyl, oleyl, and 2,4-diethylbenzyl groups.

Specific exemplary tertiary-alkylperoxy alkyl carbonates of the present invention are tertiary-butylperoxy 2-ethylhexyl carbonate, tertiary-butylperoxy octadecyl carbonate, tertiary-amylperoxy dodecyl carbonate, tertiary-butylperoxy 2,6-dimethyl-4-heptyl carbonate, tertiary-butylperoxy 2,6,8-trimethyl-4-nonyl-carbonate, cumylperoxy octadecyl carbonate, 1-methylcyclohexylperoxy dodecyl carbonate, 1-methylcyclohexylperoxy, 3,3,5-trimethylcyclohexyl carbonate, 1-adamantylperoxy octadecyl carbonate, and tertiary-butylperoxy tridecyl carbonate. Tertiary-butylperoxy and tertiary-amylperoxy alkyl carbonates wherein the alkyl group has from 8 to 20 carbons are preferred. Tertiary-butylperoxy 2-ethylhexyl carbonate and tertiary-butylperoxy octadecyl carbonate are particularly preferred.

The term "alkyl" is used, both in the specification and in the claims, in a broad sense to include simple alkyl and cycloalkyl groups as defined above; unsaturated aliphatic groups such as butenyl, propynyl, and oleyl groups; and cycloaliphatic groups such as cyclohexyl, 1-methylcyclohexyl, cyclohexenyl, and cyclopentyl groups. An "alkyl" group may be saturated or unsaturated, cyclic or open-chain, and may bear inert substituents, for example, aryl, alkyl, alkoxy, halo such as chloro, bromo, and fluoro, hydroxyl, amido, cyano, nitroso, and nitro groups. Inert substituents are those which do not adversely affect the vulcanization or the properties of the vulcanizate.

The term "aryl" refers to groups containing the benzene ring such as phenyl, benzyl, tolyl, and chlorophenyl groups; and to groups containing the aromatic fused-ring structures of, for example, naphthalene anthracene, and phenanthrene, such as naphthyl group.

Tertiary-alkylperoxy alkyl carbonates of this invention may be prepared by reaction of tertiary-alkyl hydroperoxide and an alkyl chloroformate in the presence of an organic or inorganic base. Hydroperoxides (I) and chloroformates (II) for use in making the peroxy carbonates of this invention may be represented by the formulas:

$$R_1-O-O-H \qquad Cl-\underset{\underset{O}{\|}}{C}-O-R_2$$
$$(I) \qquad\qquad (II)$$

wherein $R_1$ and $R_2$ are as hereinbefore described with respect to the tertiary-alkylperoxy alkyl carbonates. Typically, the alkyl hydroperoxide is derived from aliphatic or substituted aliphatic alcohols ($R_1OH$) of from 4 to about 14 carbon atoms. The chloroformate is prepared by reacting phosgene with aliphatic or substituted aliphatic alcohols ($R_2OH$) having from 8 to about 26 carbon atoms. Alkyl hydroperoxides and chloroformates are well known compounds, and many have been available commercially, such as tertiary-butyl hydroperoxide, tertiary-amyl hydroperoxide, cumyl hydroperoxide, 2-ethylhexyl chloroformate, 2,6-dimethyl-4-heptyl chloroformate, 2,6,8-trimethyl-4-nonyl chloroformate, and octadecyl chloroformate. Preparation of alkylperoxy alkyl carbonate esters by this method is described in U.S. Pat. No. 2,374,789, and in Strain et al, Esters of Peroxycarbonic Acids, *Journal of the American Chemical Society*, Vol. 72, page 1254 (1950), which also describes the preparation of alkyl chloroformates.

In accordance with an embodiment of the present invention, silicone rubber is prepared by heating a composition comprising a mixture of an organopolysiloxane polymer that is curable to an elastomeric state and one or more of the hereinbefore described tertiary-alkylperoxy carbonate cure initiators. Usually a reinforcing filler such as precipitated silica or carbon black is added, but a semi-reinforcing filler such as a clay or diatomaceous earth may be used if desired.

Useful organopolysiloxane, or silicone, polymers include all of those known in the art which are curable to an elastomeric state. Silicone polymers may be represented by the formula:

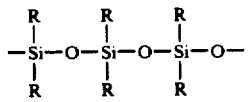

where each R independently is an organic side group selected from monovalent hydrocarbon and halogenated hydrocarbon groups and cyanoalkyl groups. The proportion of the number of side groups R to the number of silicon atoms may vary slightly depending on polymer length, the nature of chain-end groups, degree of crosslinking, etc. Generally, the ratio is in the range of from about 1.95 to about 2.01, preferably from about 1.98 to about 2.01. These silicone polymers are prepared by the condensation polymerization of low molecular weight organopolysiloxane oils. Catalysts for the condensation include ferric chloride hexahydrate, phenyl phosphoryl chloride, potassium hydroxide, sodium hydroxide, and others. The polymers are generally in the form of a very viscous mass or a gum.

The low molecular weight organopolysiloxane oils are made by the hydrolysis and dehydration of corresponding dihalosilanes and trihalosilanes, $R_2SiCl_2$ and $RSiCl_3$, where R has the same definition as for the polymer. The hydrolysis is done at low temperature, about 0° C. or lower, for example in ice water. A solvent or diluent such as butanol or ethyl ether may be present. The halosilane may be diluted with a solvent such as ether or toluene prior to hydrolysis. Hydrolysis produces a diorganodihydroxysilane which dehydrates to give the low molecular weight silicone oils. Addition of trihalosilane in the hydrolysis reaction gives a low molecular weight cross-linked product which is polymerizable to a hard resin.

U.S. Pat. Nos. 2,541,137, 2,448,556, 2,448,756, 2,521,528, 2,457,688, and 3,313,762 describe silicone polymers which may be used with the tertiary-alkylperoxy alkyl carbonate cure initiators of this invention.

Specific examples of R include aryl groups such as phenyl, chlorophenyl, xylyl, and tolyl; arylalkyl groups such as phenylethyl and benzyl; alkyl, alkenyl, cycloalkyl and halogenated alkyl groups such as methyl, ethyl, vinyl, allyl, propyl, chlorobutyl, trifluoropropyl, and cyclohexyl; and cyanoalkyl groups such as cyanoethyl, cyanopropyl, and cyanobutyl groups. The most commonly used side group is methyl; phenyl and vinyl groups are also common.

In a silicone polymer where R is primarily methyl, a small proportion, for example from 1 to 20 or more mole percent of phenyl groups give improved radiation resistance and low temperature flexibility. Vinyl groups improve vulcanization characteristics and compression set. Cyanoalkyl groups increase oil resistance. The polymer characteristics may be tailored by the inclusion of several different types of side groups if desired. Typically, the side group is introduced at the hydrolysis and dehydration stage as the corresponding methyldichlorosilane, for example methylphenyldichlorosilane or methylvinyldichlorosilane. Polymers of this type are called copolymers.

Organopolysiloxane copolymers containing alkenyl side groups are preferred for use in the present invention. The groups may be vinyl, allyl, etc. Usually they are vinyl groups. The vinyl side groups are typically a small proportion of the total number of side groups, preferably from about 0.05 to about 2 mole percent. The presence of unsaturated groups in the polymer does not lead to ozone degradation of the vulcanizate, as might be expected, because the groups become saturated in the course of vulcanization. One copolymer of this type is easily prepared by hydrolyzing and then polymerizing a mixture of dimethyldichlorosilane and methylvinyldichlorosilane having the desired proportion of vinyl groups.

The quantity of tertiary-alkylperoxy alkyl carbonate to be used may vary widely, depending on the nature of the rubber composition and the chosen method of vulcanization. It should be a minor amount sufficient to cure the composition to an elastomeric state. Generally from about 0.1 to about 10 parts, often from about 0.1 to about 5 parts, usually from about 0.25 to about 3 parts, of initiator per 100 parts of silicone polymer may be used.

In a method of vulcanization such as hot air vulcanization where incomplete surface cure can be a problem, the peroxy carbonates of the present invention will of course be used in a minor amount, i.e., less than about 10 parts, sufficient to provide complete surface cure, as indicated by the absence of tacky, uncured rubber composition on the surface of the vulcanizate. The amount necessary for good hot air vulcanization depends in part on the particular initiator being used, on the vulcanization temperature, the residence time, the type of silicone polymer, the kind and amount of filler, etc., but will fall generally within the ranges specified above.

Other organic peroxide initiators such as dicumyl peroxide and tertiary-butyl perbenzoate may be used in combination with the tertiary-alkylperoxy carbonates of the present invention in order to impart special properties to the vulcanizate.

Any of the commonly used reinforcing and semi-reinforcing fillers may be used. Reinforcing fillers include carbon black and the manufactured silicas. The manufactured silicas, which provide the greatest degree of reinforcement, include fumed silica, made by burning silicon tetrachloride or ethyl silicate in the vapor phase, and precipitated silica, made by precipitation of a soluble silicate as described, for example, in U.S. Pat. No. 2,940,830. A typical commercial form of reinforcing precipitated silica is manufactured and sold by PPG INDUSTRIES, INC., under the designation Hi-Sil 233. Semi-reinforcing fillers include diatomaceous earth, lithopane, calcium carbonate, and metal oxides such as titanium oxide and iron oxide.

Other conventional ingredients may be present: heat stabilizers such as red iron oxide or aryl urethanes; blowing agents; process aids to ease the milling of compositions with high filler content; pigments, preferably inorganic; and structure additives such as silanol-stopped and alkoxy-stopped polydiorganosiloxanes, for examples, polydimethylsiloxanes, and diphenylsilanediol.

The various ingredients of the composition may be mixed in any conventional way, for example on a roll mill or in a Banbury or a doughmixer. The order of addition of the ingredients is not critical, but it is preferable to add the cure initiator to the silicone polymer when the filler is added or afterward. After mixing, the vulcanizable composition is shaped to form an article that is then vulcanized by heating.

The composition can be vulcanized by all of the common methods. For example, it can be molded under heat and pressure, generally from about 100° to 300° C. or higher and from about 100 to about 2000 p.s.i. or more for an appropriate time. Hot liquid vulcanization can be used, wherein the composition is passed through a bath of heated liquid. Although autoclave vulcanization sometimes gives incomplete surface cures unless the article to be vulcanized is wrapped in cellophane or damp cloth, compositions containing the initiators of the present invention would not require such a wrapping step.

In accordance with another embodiment of the present invention, the novel tertiary-alkylperoxy alkyl carbonates are used successfully in compositions vulcanized by methods in which at least a part of the surface of the article is exposed while the article is being heated. Usually the article is heated by direct contact with a heated gas, but the article may also be heated by radiant heat passing through the gas or even through a vacuum. A surface is "exposed" if it is in contact with a gas, which may be at atmospheric pressure or at a higher or lower pressure. Such methods include autoclave and hot air vulcanization.

In hot air vulcanization, the silicone composition, usually in the form of an extruded article, is passed, and usually continuously, through a horizontal or vertical chamber such as a hot air oven and contacted directly with heated gas, usually either hot air or steam. The curing temperature is high, typically from about 315° to about 425° C., and residence times, during which the extrudate is heated, are short, from just a second or so up to a minute or more depending on the thickness of the section and on the nature of the composition. The extruded article may be heated for from about 1 to about 120 seconds or more, but a range of from about 30 to about 90 seconds is more usual. For a thin extrusion, the vulcanizing time is typically from about 40 to about 80 seconds. Silicone rubber cured by hot air vulcanization in accordance with the present invention has a completely cured, smooth, nontacky surface and low porosity.

When a curable silicone rubber composition is cured by direct contact with heated gas, the cure initiator used must have sufficient ability to cure the exposed surfaces of the composition as well as the protected interior. Some cure initiators are inhibited by the presence of oxygen, which is said to act as a trap for free radicals. Oxygen inhibition has been considered as one factor in the poor performance of availale peroxides in hot air vulcanization. In addition, an initiator which decomposes to yield volatile substances such as benzene may cause excessive porosity in the vulcanizate.

Tertiary-alkylperoxy alkyl carbonates useful in hot air vulcanization have a total of at least about 12 carbons in $R_1$ and $R_2$. The maximum number of carbons is limited primarily by economic considerations; about 40 carbons is considered a practical limit. Peroxy carbonates having from about 12 to 24 carbons are preferred. Within these ranges, initiators having more carbons are more tolerant of variations in processing conditions and formulations, and those having fewer carbons may be more economical to use.

A peroxy carbonate initiator having 12 carbons in $R_1$ and $R_2$ is, for example, t-butylperoxy 2-ethylhexyl carbonate, which may be prepared from two readily available and relatively inexpensive starting materials. For this reason it is especialy desirable for use in hot air vulcanization.

A post-vulcanizaion cure in an air circulting oven is generally used to remove vulcanization by-products and low molecular weight polymers, thereby improving the stability and chemical resistance and minimizing the compression set of the vulcanizate. Oven cures of from 1 to 24 hours or more at temperatures up to about 260° C. or higher are typical.

The following examples serve to illustrate the manner in which the present invention may be practiced.

EXAMPLE I

Tertiary-butylperoxy octadecyl carbonate was prepared by reaction of tertiary-butyl hydroperoxide with octadecyl chloroformate. Tertiary-butyl hydroperoxide, 70 percent (27.0 grams, 0.21 mole) was placed in a flask, and sodium hydroxide, 20 percent (43.3 grams, 0.22 mole) was added slowly at lower than 20° C., followed by the addition of 10.0 grams of isopropanol all at once. Octadecyl chloroformate (66.5 grams, 0.20 mole) and hexane (115.8 grams) were combined in an addition funnel and added over a period of 90 minutes at about 35° C. The resulting mixture wa phase-separated and the organic layer was washed with three 100 milliliter portions of water. Yield was 179.9 grams, 93.2 percent by weight of theoretical.

Other peroxy carbonates of this invention can be made according to the method of Example I by substituting the corresponding hydroperoxide for tertiary-butyl hydroperoxide or the corresponding chloroformate for octadecyl chloroformate. For example, tertiary-amyl hydroperoxide may be substituted to make tertiary-amylperoxy octadecyl carbonate. Further substitution of 2,6,8-trimethyl-4-nonyl chloroformate would yield tertiary-amylperoxy 2,6,8-trimethyl-4-nonyl carbonate. Similarly, hydroperoxides such as cumyl, 1-methylcyclohexyl, 1-adamantyl, 2,3-dimethyl-2-butyl, 3-ethyl-3-pentyl, and 2,4,4-trimethyl-2-pentyl hydroperoxides and chloroformates such as 3,3,5-trimethylcyclohexyl, 2-ethylhexyl, 4-t-butylcyclohexyl, 2,6-dimethyl-4-heptyl, decyl, dodecyl, and even mixed, e.g., mixed tetradecyl and hexadecyl, chloroformates may be used in equivalent molar quantities in the procedure of Example I.

EXAMPLE II

The silicone rubber compositions of Table I were prepared, extruded, and continuously vulcanized in a standard horizontal hot air vulcanization unit. For compositions 1 to 4, the vulcanization temperature was 315° C. (600° F.). Residence time in the heated section of the unit was 40 seconds in one experiment and 80 seconds in another experiment. Composition 5 was vulcanized at 343° C. (650° F.) and a residence time of 45 seconds.

The t-butylperoxy alkyl carbonate initiator was milled into a commercial silicone rubber stock having a silica filler and an organopolysiloxane polymer composed of a major proportion of dimethylsiloxy units chemically combined with a minor proportion of methylvinylsiloxy units. The SWS 724 stock is a general purpose, extrusion grade stock with a moderate vinyl content, 20 percent by weight of reinforcing silica filler, and a Shore A durometer hardness of 35 when cured. The C 273 stock has a higher vinyl content, 35 percent by weight of reinforcing silica filler, and a cured hardness of 70. The SWS 729 is a vinyl-containing, silica filled stock with a cured hardness of 45–50.

TABLE I

| Rubber Composition | 1 | 2 | 3 | 4 |
|---|---|---|---|---|
| t-butylperoxy octadecyl carbonate | 1.05 | 1.05 | 2.10 | 2.10 |
| t-butylperoxy 2-ethylhexyl carbonate | — | — | — | — |

TABLE 1-continued

| Rubber Composition | 1 | 2 | 3 | 4 |
|---|---|---|---|---|
| Silicone SWS 724 | 100 | — | 100 | — |
| Silicone C 273 | — | 100 | — | 100 |
| Silicone SWS 729 | — | — | — | — |

When vulcanized at residence times of both 40 seconds and 80 seconds, compositions 1 through 4 all gave vulcanizates having complete surface cure as evidenced by the absence of a tacky skin of uncured composition on the surface. The SWS 724 stock gave a vulcanizate with some porosity in the center, but the harder C 273 stock gave a vulcanizate with little porosity.

Composition 5 gave a vulcanizate with a nearly complete surface cure, although a slight tackiness could be felt.

Although the present invention has been described with reference to certain details of specific embodiments, it is not intended that the invention be construed as limited to the details except insofar as they are set forth in the appended claims.

I claim:

1. A method of vulcanizing a silicone rubber composition which comprises:
   a. preparing a heat-vulcanizable composition comprising
   i. 100 parts of organopolysiloxane polymer gum curable to an elastomeric state and represented by the formula

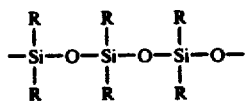

wherein:
   R is selected independently from the group consisting of monovalent hydrocarbon groups, monovalent halogenated hydrocarbon groups, and monovalent cyanoalkyl groups, and
   ii. in a minor amount between about 0.1 and 10 parts per 100 parts of organopolysiloxane polymer sufficient to provide complete surface cure, a tertiary-alkylperoxy alkyl carbonate cure initiator represented by the formula

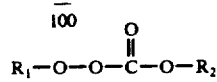

wherein:
   $R_1$ is a tertiary alkyl group having 4 to 14 carbons and
   $R_2$ is an alkyl group having 8 to 26 carbons;
   b. shaping heat-vulcanizable composition to form an article having a surface; and
   c. contacting at least a part of the surface of the article with a heated gas for between about 1 and 120 seconds at a temperature above about 315° C. and at about atmospheric pressure or below in order to cure the article to an elastomeric state and to provide a complete surface cure.

2. The method of claim 1 wherein $R_1$ and $R_2$ together have a total of from 16 to 24 carbons.

3. The method of claim 1 wherein the heated gas is air.

4. The method of claim 1 wherein the heated gas is steam.

5. The method of claim 1 which comprises forming the article by continuously extruding heat-vulcanizable composition and continuously passing the extruded article through a hot air oven.

6. The process of claim 5 wherein the curing temperature is from about 315° to 425° C.

7. The process of claim 6 wherein the carbonate initiator is tertiary-butylperoxy octadecyl carbonate.

8. The process of claim 6 wherein the carbonate initiator is tertiary-butylperoxy 2-ethylhexyl carbonate.

9. The method of claim 1, wherein between about 0.05 and 2 percent of the R groups are alkenyl groups.

10. The method of claim 9, wherein the alkenyl groups are vinyl groups.

* * * * *